United States Patent Office 3,420,861
Patented Jan. 7, 1969

3,420,861
EFFICIENT PREPARATION OF RARE-EARTH
METAL OXALATE
Richard C. Ropp, Warren, and Eugene A. Graff, Cedar Grove, N.J., assignors to Westinghouse Electric Corporation, Pittsburgh, Pa., a corporation of Pennsylvania
No Drawing. Filed Feb. 23, 1968, Ser. No. 707,433
U.S. Cl. 260—429.2        9 Claims
Int. Cl. C07f 5/00; C09k 1/02

ABSTRACT OF THE DISCLOSURE

An improved method of preparing rare-earth metal oxalate, by which there is obtained a significant increase in the rare-earth metal oxalate yield from rare-earth metal ion-containing solution. An aliphatic alcohol is included with an oxalate-compound-containing solution and the mixed oxalate-alcohol solution is added to the rare-earth metal-containing solution to precipitate the rare-earth metal oxalate. The amount of oxalate compound required is thereby reduced while the amount of rare-earth metal oxalate recovered is significantly increased.

BACKGROUND OF THE INVENTION

The advantages of using rare-earth metal oxalate in the production of rare-earth metal-containing phosphor compositions is well known in the art. The rare-earth metal-containing phosphor compositions are used in a variety of applications ranging from fluorescent lamps to cathode-ray tubes. An important commercially used class of phosphors are the rare-earth metal oxide phosphors activated by rare-earth metals.

The method of precipitating rare-earth metal oxalate from a rare-earth metal containing solution which is admixed with an oxalating compound is well known in the art. In the prior art preparation of rare-earth metal oxalate from an acid solution containing rare-earth metal ions an insignificant portion of the rare-earth metal remains in solution requiring further treatment to effectively utilize all of the rare-earth metal. The rare-earth metals are an expensive raw material and with increased commercial use of the rare-earth metal-containing phosphor compositions it becomes increasingly economically important to maximize the efficiency of preparation of the rare-earth metal oxalate and resulting rare-earth metal phosphor compositions. The prior art method of rare-earth metal oxalate preparation also requires a large excess of oxalate compound in the formation of the rare-earth metal oxalate.

SUMMARY OF THE INVENTION

It is an object of this invention to provide an improved method of efficiently preparing rare-earth metal oxalate, as well as the phosphor produced therefrom.

It is another object of this invention to improve the percentage recovery of rare-earth metal from solution in the precipitation of rare-earth metal oxalate.

It is still another object of the invention to eliminate the need for large excesses of oxalate compound in precipitating rare-earth metal oxalate from rare-earth metal-containing acid solution.

The aforementioned objects and others which will become apparent as the description proceeds are accomplished by including a soluble aliphatic alcohol in the solution from which the rare-earth metal oxalate is precipitated. A first solution containing rare-earth metal ions is prepared, and a second solution of oxalate-radical-containing compound is prepared to which the aliphatic alcohol is preferably added. The second solution and aliphatic alcohol are preferably slowly admixed with the rare-earth metal ion-containing first solution to efficiently precipitate rare-earth metal oxalate. Preferred ratios of constituents are specified to maximize the recovery of the rare-earth metal as oxalate.

The addition of the aliphatic alcohol compound allows for a very high percentage recovery of rare-earth metal oxalate from solution, while at the same time reducing the amount of oxalating compound required to precipitate the rare-earth metal oxalate. Apparently, the alcohol compound in the solution lowers the solubility product of the rare-earth metal oxalate in solution.

DESCRIPTION OF THE PREFERRED EMBODIMENTS

Example I

In the practice of the present invention, a first solution is formed by dissolving about 112.9 grams of $Y_2O_3$ in about 225 milliliters of concentrated nitric acid, heating as required to effect dissolution. This solution is diluted to about 2.5 liters total volume by adding distilled water. An oxalic acid second solution is prepared by adding 365 grams of oxalic acid to 1.25 liters of distilled water. About 536.5 ml. of ethanol and about 525 ml. of distilled water are added to oxalic acid solution. The rare-earth metal acidic solution and the oxalic acid ethanol solution are heated to about 80° C. and the oxalic acid-ethanol solution is slowly stirred into the rare-earth metal acid solution. Yttrium oxalate is precipitated and after allowing the precipitate to settle, it is separated by decantation, water washed, filtered, and dried.

The amount of yttrium oxalate produced as a percentage of the yttrium originally in solution is about 10% greater than the amount of yttrium oxalate produced without the addition of the aliphatic alcohol. Also about 14 percent less oxalic acid is required in precipitating the increased amount of yttrium oxalate than if no aliphatic alcohol were included.

This yttrium oxalate can be used directly as a raw material in producing phosphor compositions.

Example II

In the practice of the present invention, as an example, 45.2, grams of yttrium oxide and 5.3 grams of europium oxide are dissolved in about 90 milliliters of concentrated nitric acid, heating as required. This solution is diluted to 1000 milliliters total volume with distilled water. A 14.6% by weight oxalic acid solution is prepared by adding 146 grams of oxalic acid to 500 milliliters of distilled water. The oxalic acid solution has 238 milliliters of denatured alcohol and about 212 milliliters of distilled water added thereto to bring the total volume to one liter. Both the rare-earth metal acid solution and the oxalic acid-alcohol solution are heated to about 80° C. and the oxalic acid-alcohol solution is slowly stirred into the rare-earth metal acid solution. The yttrium-europium oxalate is coprecipitated. After allowing the precipitate to settle, it is separated by decantation, water washed, filtered and dried overnight. The amount of rare-earth metal precipitated as oxalate is significantly increased by virtue of the addition of the alcohol, and the amount of oxalate compound needed to precipitate a given amount of the rare-earth metal oxalate is also significantly reduced. Calcination of this coprecipitated rare-earth metal oxalate for four hours at about 1360° C. in air produces a bright red emitting phosphor composition suitable for fluorescent lamp use or color television tube applications.

Example III

The present invention can also be practiced using larger batch sizes, so that about 895 grams of yttrium oxide and 105 grams of europium oxide are dissolved in about 1.8 liters of concentrated nitric acid solution. This rare-earth metal acid solution is diluted with distilled water to provide a rare-earth metal oxide concentration of one mol per 2.5 liters of solution. A 10.5% by weight oxalic acid solution is prepared by adding 2.9 kilograms of oxalic acid to 13.7 liters of distilled water. An aliphatic alcohol such as methanol in an amount of about 1.25 gallons is added to the oxalic acid solution and this mixture after heating to about 80° C. is slowly stirred into the rare-earth metal-containing acid solution which is also preheated to about 80° C. and maintained at that temperature. The coprecipitated yttrium-europium oxalate is separated from the solution filtered, washed and dried. The amount of rare-earth metal oxalate precipitated is approximately 95% of the total rare-earth metal included in the acidic solution initially in this example. When preparing yttrium-europium oxalate it is desired that the europium be maintained in the trivalent state. This is aided by adding an amount of hydrogen peroxide to the rare-earth metal containing acid solution in the above example. In this example about 2 liters of hydrogen peroxide can be added to the rare-earth metal-containing acid solution.

When the raw mix of the above example is fired for four hours at 1360° C. in air a bright red emitting phosphor is produced.

Example IV

Other rare-earth metal oxalates can be prepared as in the aforementioned examples. Another very useful mixed rare-earth metal oxalate is gadolinium-europium oxalate which is prepared as in Example II but wherein the yttrium oxide and europium oxide amounts are replaced by 948 grams of gadolinium oxide and 52 grams of europium oxide.

Example V

In another embodiment 860 grams of yttrium oxide and 140 grams of cerium oxide are dissolved in the nitric acid solution and precipitated as in Example II to form the coprecipitated yttrium-cerium oxalate. This oxalate can be advantageously combined with phosphate compound and calcined to form a phosphor composition.

Example VI

In another embodiment 830 grams of lanthanum oxide and 170 grams of the commercially available $Tb_4O_7$ are dissolved in a nitric acid and precipitated as explained in Example II to form the coprecipitated lanthanum-terbium oxalate. This oxalate can be advantageously mixed with silica or phosphate compound and calcined to form a phosphor composition.

While the rare-earth oxides in the above examples were dissolved in nitric acid, other acids such as acetic acid, hydrochloric acid can be used. Also, while rare-earth oxides were dissolved in acid in the above examples other soluble rare-earth metal-containing compounds such as rare-earth acetates can be dissolved in the acid solution.

Aliphatic alcohols that are soluble in the rare-earth acid solution and oxalic acid mixture can be used in the practice of the invention. In the above example, ethanol, methanol, and denatured alcohol which is commercially available comprising 95% ethanol–5% methanol, and denaturent additives, were used as the aliphatic alcohols. Other aliphatic alcohols that can be substituted in the example include isopropanol, tertiary butanol, and allyl alcohol. The above mentioned aliphatic alcohols are given by way of example and others will be readily suggested to one skilled in the art.

While specific rare-earth metals are specified in the examples, this is merely illustrative and the other rare-earth metals such as yttrium, lanthanum and the lanthanide elements which form oxalates can be efficiently precipitated by this method.

The amount of aliphatic alcohol added to the solution can be varied. However the greatest recovery of rare-earth metal oxalate with the smallest addition of oxalate radical is achieved when the aliphatic alcohol is added in a gram-mole ratio with respect to the rare-earth metal ions in solution of about 9.2/1. As the gram-mole ratio of alcohol is diminished a greater amount of oxalate radical must be incorporated in solution and the total recovery will be lessened. The aliphatic alcohol should be present in at least a gram-mole ratio of about 1.85 moles of aliphatic alcohol per gram-atom of rare-earth metal ion included in solution. In the preferred embodiment, when the gram-mole ratio of aliphatic alcohol to gram-atoms of rare-earth metal ions in solution is about 9.2/1, the percent recovery of rare-earth metal as oxalate is about 96.6%. The amount of oxalate radical containing compound that is required to produce this recovery is reduced by about 14% by molar amount from that required when no aliphatic alcohol is present. The inclusion of relative amounts of aliphatic alcohol greater than the preferred amount can be made, but have not been found to yield improved recovery results over those obtained using the preferred amounts. When the gram-mole ratio of aliphatic alcohol to gram-atoms of rare-earth metal ions is about 7.4/1 the percent recovery is about 94% of the total rare-earth metal in solution.

The aliphatic alcohol is preferably included with the oxalate radical-containing solution which is then added to the rare-earth metal acidic solution. However, the aliphatic alcohol can be added to the rare-earth metal acidic solution, and the precipitation is effected as in the examples by adding the oxalate radical containing solution.

The amount of oxalate radical contained in solution required to precipitate a given amount of rare-earth metal oxalate can be reduced from the prior art amount of about 3 gram-atoms of oxalate radical per gram-atom of rare-earth metal ion in solution when no aliphatic alcohol is used, to about 2.6 moles of oxalate radical per gram-atom of rare-earth metal ion in solution in the preferred embodiment.

While oxalic acid was utilized in the examples as the oxalate compound other oxalate compounds can be substituted, such as diethyl oxalate, or dimethyl oxalate. When using these oxalate compounds the rare-earth metal acidic solution, the aliphatic alcohol, and the oxalate radical containing solution can be admixed quickly and heated to about 80° C. to slowly decompose the diethyl oxalate or dimethyl oxalate to oxalic acid.

The effect of temperature upon the solubility of the rare-earth metal oxalate has been recognized in the prior art. The preferred precipitation temperature is about 80° C. to maximize the insolubility of the oxalate although this temperature can be varied from about 40° C. up to the boiling point of the solution.

The present invention provides a method whereby the degree of hydration of the oxalates produced is kept at a minimum. The degree of hydration affects the final phosphor produced because upon firing the water is released as water vapor and this has a significant effect upon the activation process.

It will be recognized that there has been provided a method of preparing rare-earth metal oxalate by which the yield efficiency of rare-earth metal recovered as oxalate is significantly increased over the prior art and the amount of oxalating compound required to form this increased amount of oxalate is less than that was formerly required to produce a significantly smaller amount of rare-earth metal oxalate.

The specific examples are detailed illustrations of the application of the present invention and the invention is not to be limited thereto or thereby.

What is claimed is:

1. The method of efficiently preparing rare-earth metal oxalate for use as a raw-mix constituent for preparing rare-earth metal-containing phosphors, which method comprises;
    (a) forming a first solution containing rare-earth metal ions;

(b) forming an oxalate-radical-containing second solution, with the gram-mole amount of oxalate radical in said second solution to gram-atoms of rare-earth metal ions in said first solution being at least about 2.6/1;

(c) adding to either of said solutions aliphatic alcohol in an amount of at least about 1.85 moles of aliphatic alcohol per gram-atom of rare-earth metal ion in said first solution;

(d) heating said solutions and admixing said oxalate-containing solution and said rare-earth metal-containing solution to substantially precipitate said rare-earth metal as oxalate; and (e) separating said precipitated rare-earth metal oxalate from residual solution.

2. The method as specified in claim 1, wherein said solutions are preferably heated to about 80° C. to precipitate said rare-earth metal oxalate.

3. The method as specified in claim 1, wherein said aliphatic alcohol is ethanol and is present in an amount to provide a gram-mole ratio of ethanol to gram-atom of rare-earth metal ion in solution of about 9.2/1.

4. The method as specified in claim 1, wherein said aliphatic alcohol is one of the group consisting of denatured ethanol, ethanol, methanol, isopropanol, tertiary butanol, and allyl alcohol.

5. The method as specified in claim 1, wherein said rare-earth metal ion-containing first solution is prepared by dissolving rare-earth metal compound in acid solution.

6. The method as specified in claim 5, wherein said rare-earth metal compound is rare-earth metal oxide and said acid solution is nitric or hydrochloric acid solution.

7. The method as specified in claim 1, wherein an amount of hydrogen peroxide is admixed with the rare-earth metal ion-containing solution and said aliphatic alcohol compound is included in the oxalate radical containing solution.

8. The method as specified in claim 1, wherein said oxalate containing solution is added to said rare-earth metal acidic solution.

9. The method as specified in claim 1 wherein the precipated rare-earth metal oxalate is calcined to produce a rare-earth metal-containing phosphor composition.

References Cited

UNITED STATES PATENTS

| | | |
|---|---|---|
| 3,291,747 | 12/1966 | Lefever et al. _____ 752—301.1 |
| 2,967,088 | 1/1961 | Peters. |
| 2,943,101 | 6/1960 | Peters. |
| 2,899,452 | 8/1959 | Gofman. |

CARL D. QUARFORTH, *Primary Examiner.*

M. J. McGREAL, *Assistant Examiner.*

U.S. Cl. X.R.

252—301.2, 301.4; 23—23